(12) United States Patent
Behm et al.

(10) Patent No.: US 7,778,112 B2
(45) Date of Patent: Aug. 17, 2010

(54) APPARATUS AND METHOD FOR SENSING OF THREE-DIMENSIONAL ENVIRONMENTAL INFORMATION

(75) Inventors: Gary W. Behm, Hopewell Junction, NY (US); Richard E. Von Mering, Pine Bush, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/061,102

(22) Filed: Apr. 2, 2008

(65) Prior Publication Data

US 2009/0025765 A1 Jan. 29, 2009

Related U.S. Application Data

(62) Division of application No. 11/782,016, filed on Jul. 24, 2007, now abandoned.

(51) Int. Cl.
*G01S 15/88* (2006.01)
(52) U.S. Cl. .................. 367/116; 367/910; 135/911
(58) Field of Classification Search .................. 367/99, 367/116, 910; 135/911
See application file for complete search history.

(56) References Cited

U.S. PATENT DOCUMENTS

| | | | |
|---|---|---|---|
| 3,546,467 A | 12/1970 | Benjamin, Jr. | |
| 4,280,204 A | 7/1981 | Eichinger | |
| 4,858,125 A | 8/1989 | Washizuka et al. | |
| 6,298,010 B1 | 10/2001 | Ritz et al. | |
| 6,489,605 B1 | 12/2002 | Ritz et al. | |
| 7,271,707 B2 * | 9/2007 | Gonzales | 340/407.1 |
| 2006/0028544 A1 | 2/2006 | Tseng | |
| 2006/0129308 A1 | 6/2006 | Kates | |
| 2007/0000531 A1 | 1/2007 | Russo | |
| 2007/0005245 A1 * | 1/2007 | Ellis | 701/213 |
| 2007/0016425 A1 * | 1/2007 | Ward | 704/271 |
| 2008/0088469 A1 * | 4/2008 | Doemens et al. | 340/407.1 |

* cited by examiner

*Primary Examiner*—Ian J Lobo
(74) *Attorney, Agent, or Firm*—Cantor Colburn LLP; Wenjie Li (57) ABSTRACT

An apparatus for providing information about a three-dimensional environment to a user includes; a handle, at least one sensor operatively coupled to the handle, a tactile pad disposed on the handle, a plurality of tactile buttons arrayed on the tactile pad, a plurality of actuators, wherein each actuator is operatively coupled to one of the plurality of tactile buttons to control a height thereof in relation to the tactile pad, and a processor which receives signals from the at least one sensor and controls positioning of the plurality of actuators to represent a physical environment sensed by the at least one sensor.

12 Claims, 11 Drawing Sheets

APPARATUS AND METHOD FOR SENSING OF THREE-DIMENSIONAL ENVIRONMENTAL INFORMATION

CROSS-REFERENCE TO RELATED APPLICATIONS

This application is a division of U.S. patent application Ser. No. 11/782,016, filed Jul. 24, 2007, the disclosure of which is incorporated by reference herein in its entirety.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

The present invention relates generally to an apparatus for sensing of three-dimensional environmental information and a method of operating the same, more particularly, to an apparatus which provides information about a person's surroundings through a tactile output and a method of operating the same.

Currently, the nearly 300,000 blind and visually impaired people in the United States utilize conventional mobility canes which provide a very limited amount of information about their surrounding environment. A conventional mobility cane only provides information about the space surrounding a user which may be physically touched by the cane.

Various apparatus have been developed to provide blind people with information about the surrounding environment beyond the physical reach of the conventional cane. These devices typically rely on an acoustic element to provide information to the user. One example of such a device is an acoustic cane which provides sensing information through sound feedback, e.g., echo location. The acoustic cane emits a noise which reflects, or echoes, from objects within the blind person's environment. The blind person then interprets the echoes to decipher the layout of the surrounding environment. Similarly, other devices may emit light and detect reflection of the emitted light from obstacles. These devices also rely on an audio signal such as a click or a variably pitched beep to convey obstacle detection information to the user.

Devices relying on an audio signal for information conveyance are not well suited for noisy environments such as heavily trafficked streets where audible signals are difficult to detect and interpret. These devices are especially ill suited for deaf and blind individuals who are incapable of receiving the audio signals. Other drawbacks to the acoustic cane and other audio devices include that they may draw unwanted attention to the user and or interfere with the user's sense of hearing.

Accordingly, it is desirable to provide a method and apparatus for increasing the information gathering range of blind or blind and deaf people beyond the range of a conventional cane and supplying the gathered information to the user in real time and in a way which may be easily perceived in high noise level environments by both hearing and non-hearing individuals.

SUMMARY

The foregoing discussed drawbacks and deficiencies of the prior art are overcome or alleviated, in an exemplary embodiment, by an apparatus for providing information about a three-dimensional environment to a user includes; at least one sensor, a processor which receives signals from the at least one sensor and operatively controls a plurality of actuators to represent a physical environment sensed by the at least one sensor, and a plurality of tactile buttons, wherein each tactile button is operatively coupled to at least one of the plurality of actuators.

In another exemplary embodiment, a method of providing information about a three-dimensional environment to a user includes; transmitting at least one sensing signal to an environment, receiving a modified sensing signal from the environment, and controlling positions of a plurality of actuators operatively coupled to a plurality of tactile buttons, the controlling being based on the modified sensing signal.

In another exemplary embodiment an apparatus for providing information about a three-dimensional environment to a user, the apparatus including; a handle, at least one sensor operatively coupled to the handle, a tactile pad disposed on the handle; a plurality of tactile buttons arrayed on the tactile pad; a plurality of actuators, wherein each actuator is operatively coupled to one of the plurality of tactile buttons to control a height thereof in relation to the tactile pad, and a processor which receives signals from the at least one sensor and controls positioning of the plurality of actuators to represent a physical environment sensed by the at least one sensor.

BRIEF DESCRIPTION OF THE DRAWINGS

Referring to the exemplary drawings wherein like elements are numbered alike in the several Figures.

DETAILED DESCRIPTION

Disclosed herein is an apparatus for increasing the information gathering range of blind or blind and deaf people beyond the range of a conventional mobility cane and supplying the gathered information to the user in real time and in a way which may be easily perceived in high noise level environments by both hearing and non-hearing individuals and a method of operating the same. Briefly stated, a combination of infrared and ultrasonic sensing information is processed to control the height of a plurality of buttons on a tactile pad of a walking cane. In so doing, three-dimensional information about the surrounding environment may be provided to a user. Furthermore, the tactile feedback mechanism may be used in high noise environments and by users with limited hearing.

Referring now to FIGS. 1-4, there are shown a side perspective view of an exemplary embodiment of an apparatus 1 for sensing of a three-dimensional environment according to the present invention, a magnified bottom perspective view illustrating the handle of the apparatus 1, a cross-sectional view of the apparatus 1 and a top plan perspective view illustrating the sensor of the apparatus 1, respectively.

Figure 1:
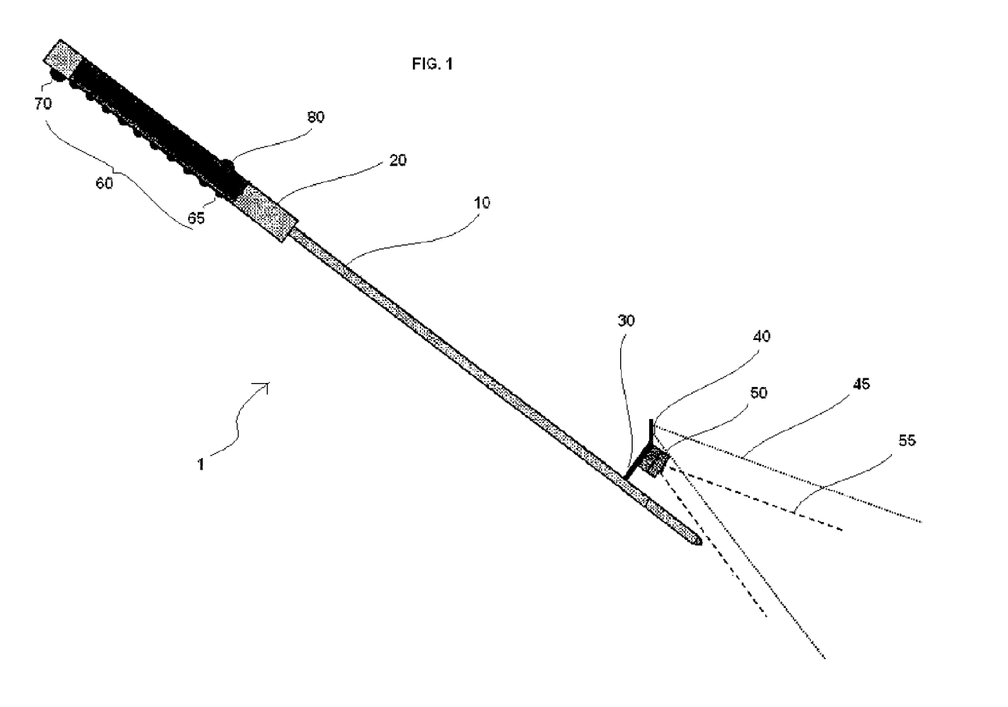
FIG. 1 is a side perspective view of an exemplary embodiment of an apparatus for sensing of a three-dimensional environment according to the present invention.
Figure 4:
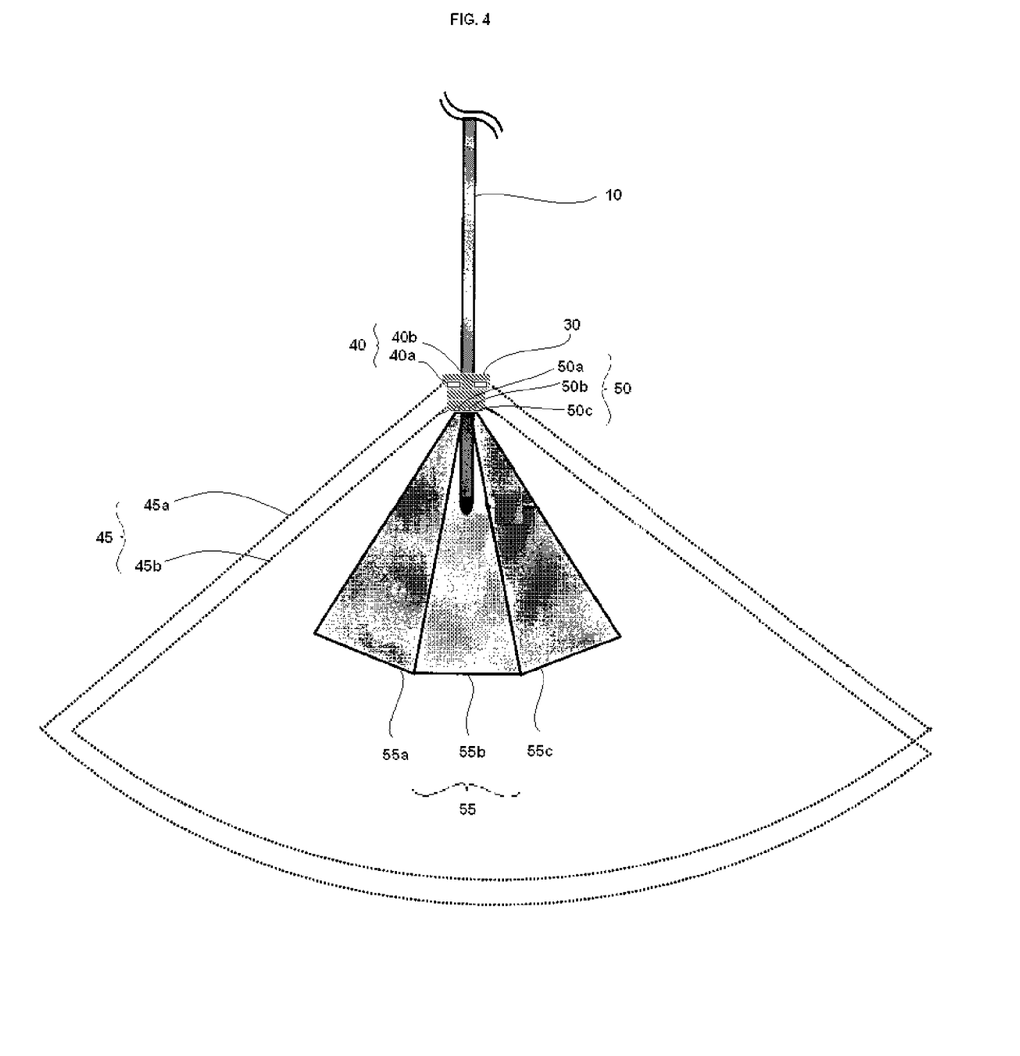
FIG. 4 is a top plan perspective view illustrating sensor ranges of the exemplary embodiment of an apparatus of FIG. 1.

As shown in FIG. 1, an exemplary embodiment of an apparatus 1 includes a shaft 10 connected to a handle 20, similar to a conventional mobility cane. However, unlike a conventional mobility cane, the present apparatus includes a sensor mast 30. The sensor mast 30 may serve as a mount for a wide array of sensor apparatus as commonly known in the art. As shown in FIG. 4, in the present exemplary embodiment, the apparatus 1 includes an ultrasonic sensor 40, which includes first and second individual ultrasonic sensors 40a and 40b, respectively, to emit ultrasonic signals 45 including first and second ultrasonic signals 45a and 45b. The present exemplary embodiment also includes an infrared sensor 50, which includes first, second and third infrared sensors 50a, 50b and 50c, respectively, to emit infrared signals 55 including first, second and third infrared signals 55a, 55b and 55c. Both the ultrasonic sensor 40 and the infrared sensor 50 are mounted on the sensor mast 30. Alternative exemplary embodiments include configurations wherein only one sensing apparatus, e.g., only the ultrasonic sensor 40 or only the infrared sensor 50 are disposed on the sensing mast 30. Alternative exemplary embodiments also include configurations wherein alternative sensing apparatus, such as apparatus using lasers or radar, are mounted on the sensing mast 30.

As shown in FIG. 4, the sensors 40 and 50 emit signals 45 and 55, respectively, to the environment. The ultrasonic sensor 40 includes the first ultrasonic sensor 40a emitting the first ultrasonic signal 45a and the second ultrasonic sensor 40b emitting the second ultrasonic signal 45b. The first and second ultrasonic sensors 40a and 40b are slightly offset from one another so as to provide an offset signal range. The first, second and third infrared sensors 50a-c are similarly offset so the emitted infrared signals 55a, 55b and 55c are also offset in different directions. This provides the apparatus 1 with a broad range of sensor coverage.

The emitted signals are then reflected from objects in the environment, such as walls, columns, trees, etc., and the sensors 40 and 50 detect these reflected signals. Each sensor has a predetermined range for the detection of reflections. In one exemplary embodiment the infrared sensor 50 may detect objects at up to three feet and the ultrasonic sensor 40 may detect objects at up to ten feet. The detected signals are then processed by a processor to be described in more detail below.

Figure 3:
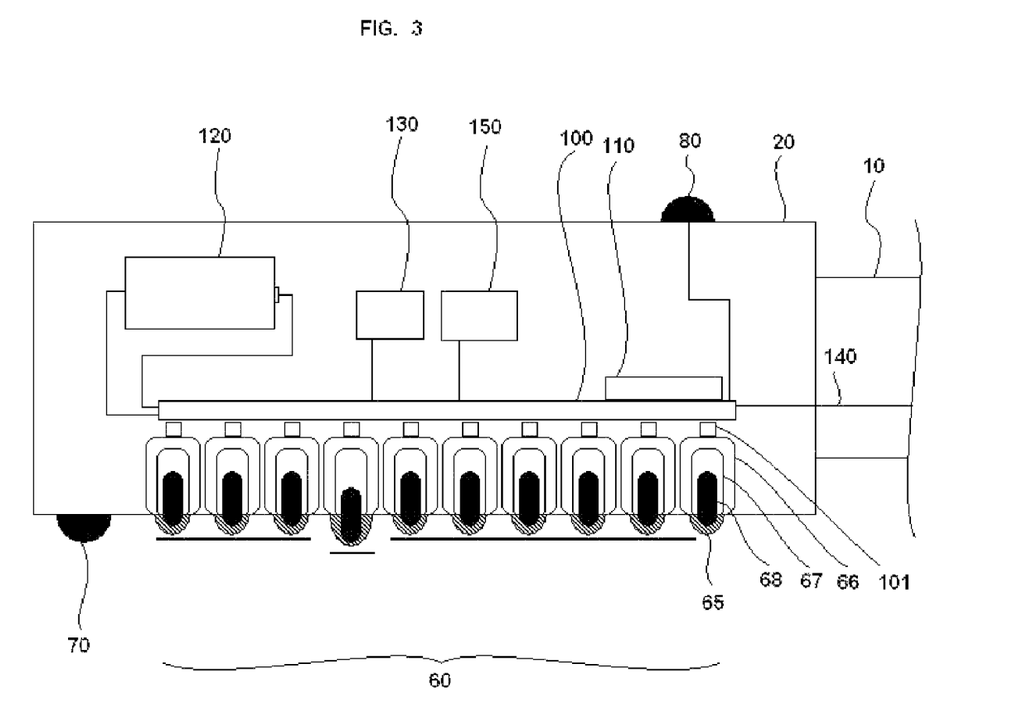
FIG. 3 is a cross-sectional view of the exemplary embodiment of an apparatus taken along line III-III' of FIG. 2.

As shown in FIG. 3, the present exemplary embodiment of an apparatus 1 also includes various modifications to the handle 20. The handle 20 includes a tactile pad 60, a plurality of buttons 65 attached to the tactile pad 60, a handle positioner 70, a reset button 80, and various other components 150.

Figure 2:
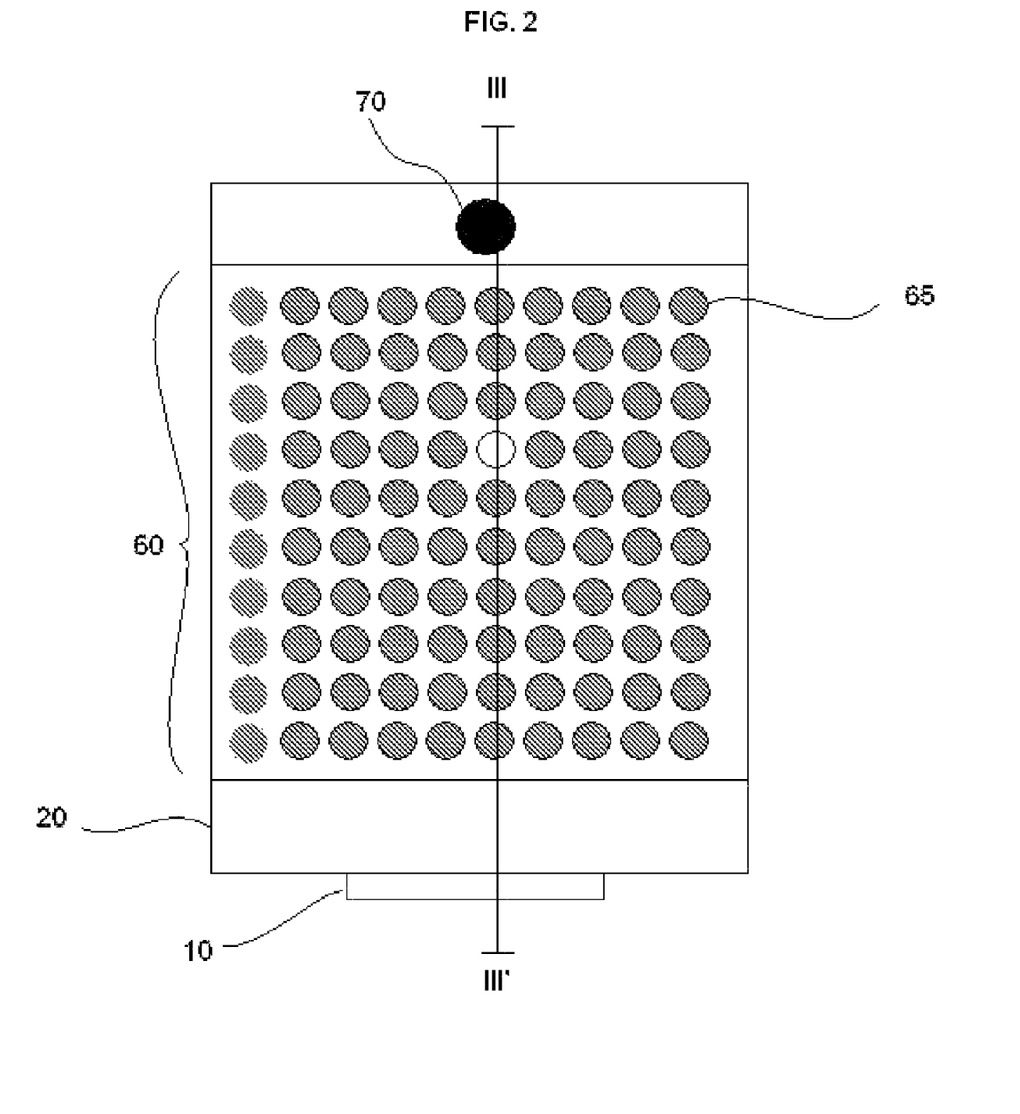
FIG. 2 is a magnified bottom perspective view illustrating the handle of the exemplary embodiment of an apparatus of FIG. 1.

As shown in FIGS. 2 and 3, the handle 20 incorporates a tactile pad 60 including a plurality of buttons 65 which enable tactile feedback of information sensed from the sensors 40 and 50 positioned on the sensor mast 30, as shown in FIG. 1. An actuator such as a solenoid 66 powers each of the plurality of buttons 65. The solenoid 66 further includes a magnetic coil 67 with a ferromagnetic rod 68 disposed therein. The solenoid may move the ferromagnetic rod 68 within the magnetic coil 67. As shown in FIG. 3, the ferromagnetic rod 68 may be positioned to force the rubber button 65 positioned above it to project from the surface of the tactile pad 60. For the purposes of illustration as shown in FIG. 2, herein, buttons 65 which are projected from the tactile pad 60 will be illustrated in white, while buttons 65 which are not being projected by the plurality of actuators will be illustrated in gray. Alternative exemplary embodiments include configurations wherein various other actuators may be used instead of, or in conjunction with, the solenoids 66.

In one exemplary embodiment, the solenoids 66 are latching solenoids which can pass current through the magnetic coil 67 in either direction to control the position of the ferromagnetic rod 68. Latching solenoids have the advantage of being able to control the position of the ferromagnetic rod 68 without having to constantly maintain current through the magnetic coil 67, and therefore such solenoids offer improved power consumption profiles in portable applications.

The solenoids 66 are connected to a circuit board 100 through electrical connections 101. The circuit board 100 is also electrically connected to a processor 110, a power supply 120, a vibrator 130, the reset button 80, and the sensors on the sensor mast 30 is connected via signal line 140. The other components 150 may include an orientation apparatus (not shown) which provides orientation information about the apparatus's position in space. Exemplary embodiments of the orientation apparatus include accelerometers and various other mechanisms as commonly known in the art.

The sensors 40 and 50, the processor 110, the tactile pad 60, the vibrator and various other components are powered by the power supply 120. The power supply 120 may be a battery, a fuel cell or various other components as commonly known in the art.

Analog information from the ultrasonic sensors 40 and the infrared sensors 50 is input to an analog to digital converter (not shown) before being sent to the processor 110. The processor 110 processes the converted signals from the sensors 40 and 50 to determine information about the surrounding environment. The processor 110 specifically interprets the signals received from the sensors 40 and 50 along signal line 140 to determine distances and directions to potential obstacles within the sensor ranges. The processor then supplies the processed information to a digital to analog converter (not shown) before supplying the information to the vibrator 130 and the plurality of solenoids 66 to provide information about the surrounding environment to the user through tactile feedback. The handle positioner 70 allows a user to ensure consistent hand positioning with respect to the tactile pad 60.

In the present exemplary embodiment information from different sensors may be displayed at different positions on the tactile pad 60, e.g., information obtained from the infrared sensor 50 may be output to solenoids 66 in the rows closest to the handle positioner 70 and information obtained from the ultrasonic sensor 40 may be output to the solenoids 66 in rows further from the handle positioner 70. In one exemplary embodiment each subsequent row of buttons from the handle positioner 70 displays information corresponding to an increase of one foot of distance from the sensor mast 30, e.g. the first row of buttons 65 displays information corresponding to sensor information from one foot away, the second row of buttons 65 displays information corresponding to sensor information from two feet away, etc.

Hereinafter an exemplary embodiment of a method of operating the apparatus 1 will be described with reference to FIGS. 5A-11B. FIGS. 5-11A are schematic top down views illustrating steps in an exemplary embodiment of a method of operating the exemplary embodiment of an apparatus 1 according to the present invention and FIGS. 5-11B are bottom perspective views of the exemplary embodiment of the apparatus 1 according to the steps in the exemplary embodiment of a method of operating the exemplary embodiment of an apparatus 1 according to the present invention.

Figure 5A:
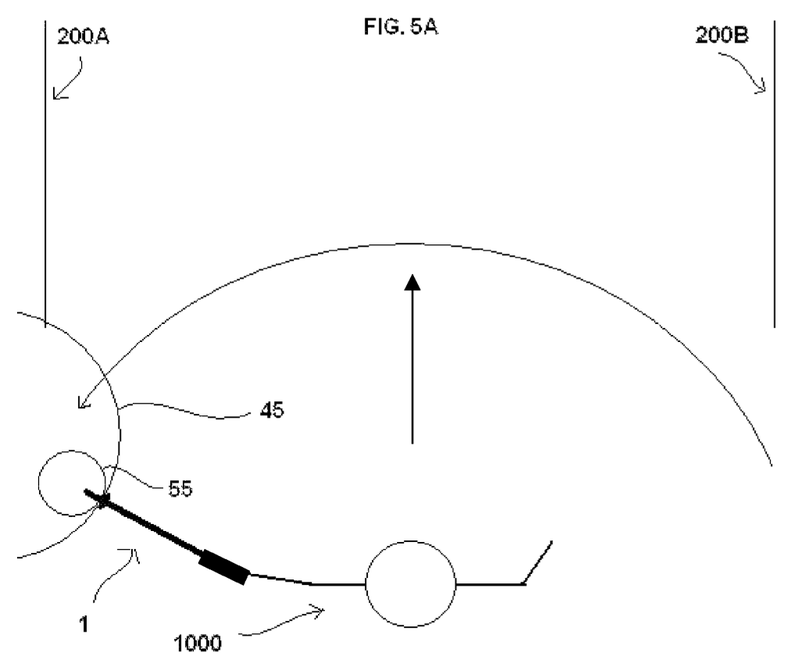
FIGS. 5A, 6A, 7A, 8A, 9A, 10A and 11A are schematic top down views illustrating a first, second, third, fourth, fifth, sixth and seventh step, respectively, in an exemplary embodiment of a method of operating the exemplary embodiment of an apparatus according to the present invention.

FIGS. 5A-11B illustrate an exemplary embodiment of a method of operating the exemplary embodiment of an apparatus 1 according to the present invention wherein a user 1000 is approaching and subsequently maneuvering within a hallway with sides 200A and 200B and maneuvering around an obstacle 300. Referring now to FIGS. 1 and 5A-B, a user 1000 performs an initial setup process by placing the tip of the apparatus 1 on the ground and pressing the reset button 80 on the handle 20. This prepares the apparatus 1 to begin receiving spatial information about its surroundings by clearing any previous environmental data.

Figure 5B:
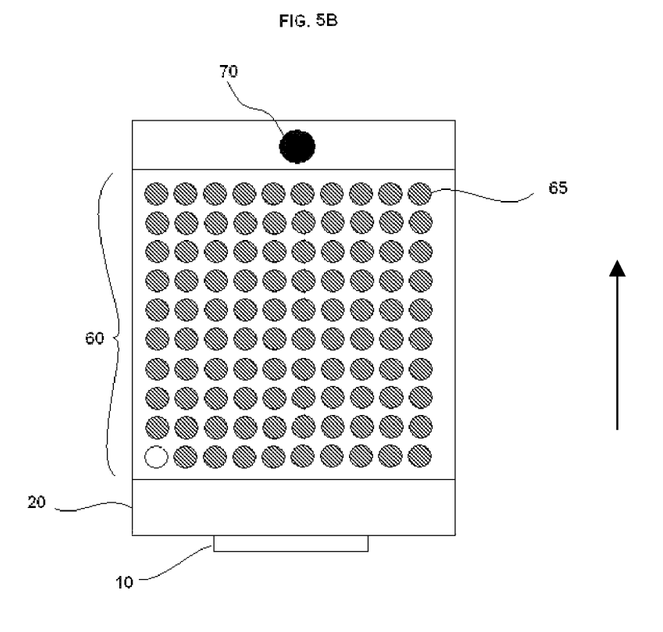
FIGS. 5B, 6B, 7B, 8B, 9B, 10B and 11B are bottom perspective views of the exemplary embodiment of the apparatus according to the first, second, third, fourth, fifth, sixth and seventh step, respectively, in the exemplary embodiment of a method of operating the exemplary embodiment of an apparatus according to the present invention.

The user 1000 then sweeps the apparatus 1 in a left-to-right and right-to-left motion, similar to the motion used in a conventional mobility cane. However, unlike the conventional mobility cane, the exemplary embodiment of an apparatus 1 is not required to physically contact the ground or other objects surrounding the user 1000.

As shown in FIG. 5A, at the peak of the initial sweep to the left the user 1000 presses the reset button 80 as part of an initialization process that sets parameters for feedback from the tactile pad 60 and the vibrator 130. Pressing the reset button 80 here signals the processor 110 that the sweep to the left has reached its furthest point and assigns any information processed from the area directly in front of the apparatus 1 to the leftmost side of the tactile pad 60. It is also necessary to press the reset button here in case the apparatus 1 has no reflections to track to determine a change in the apparatus 1's motion.

The processor 110 then interprets data from the sensors 40 and 50. In the environment shown in FIG. 5A, the user 1000 encounters the wall 200A at the peak of the initial sweep to the left. The sensors 40 and 50 detect reflections of their individually output signals from the wall 200A. The sensors 40 and 50 send the reflection information to the processor 110 which interprets the received reflections as the presence of a solid object and generates a map corresponding to the location of the solids.

The processor can determine the direction of motion of an object relative to the apparatus 1; this is especially facilitated by the sensors 40 and 50 including several offset sensors. As shown in FIG. 5A, the wall 200A is detected first by the second ultrasonic sensor 40*b* which is offset to the left. The wall 200A is then subsequently detected by the second ultrasonic sensor 40*b*. The processor is able to determine that the object has moved from the leftmost sensor range into a middle, or overlapping, sensor range and therefore the apparatus 1 is moving in a right-to-left motion. The processor determines the direction of the motion and outputs the processed information to the tactile pad 60. In one exemplary embodiment the processor 110 outputs a new map whenever the processor 110 determines a change in the direction of the apparatus 1's motion, e.g., from moving left to moving right. This allows an updated set of information to be displayed after every sweep of the apparatus 1.

Alternative exemplary embodiments include configurations wherein the processor determines the direction of motion and or the orientation of the apparatus 1 from an orientation apparatus such as an accelerometer in conjunction with, or instead of, the motion sensing method described above. Additional alternative exemplary embodiments include configurations wherein new maps are processed and output by the processor 110 at various other times, such as the middle of a right-to-left or left-to-right sweep, after several sweeps, or at any time which is convenient for that particular application. In one exemplary embodiment maps are output to the tactile pad 60 while they are being generated, this allows for real-time display of the three-dimensional environmental information.

FIG. 5B illustrates that in response to the processed reflection information, the processor 110 outputs the map generated from processing the received reflections from the sensors 40 and 50 to the tactile pad 60. The tactile pad displays the map by activating a solenoid 66 which projects a rubber button 65 on the tactile pad 60. Because the apparatus 1 has been recently reset as described above, the tactile pad 60 contains only the three-dimensional environmental information which has been input since the first depressing of the reset button 80. Also, the processor outputs the information about the leftmost part of the environment on the leftmost part of the tactile pad 60 (the left portion of FIG. 5B). The leftmost part of the environment is determined by the pressing of the reset button at the peak of the swing to the left. The pressing of the reset button ensures that the processor 110 is aware that the right-to-left sweep is finalized in case the apparatus 1 has no reflections to track changes in the apparatus 1's motion.

Figure 6A:
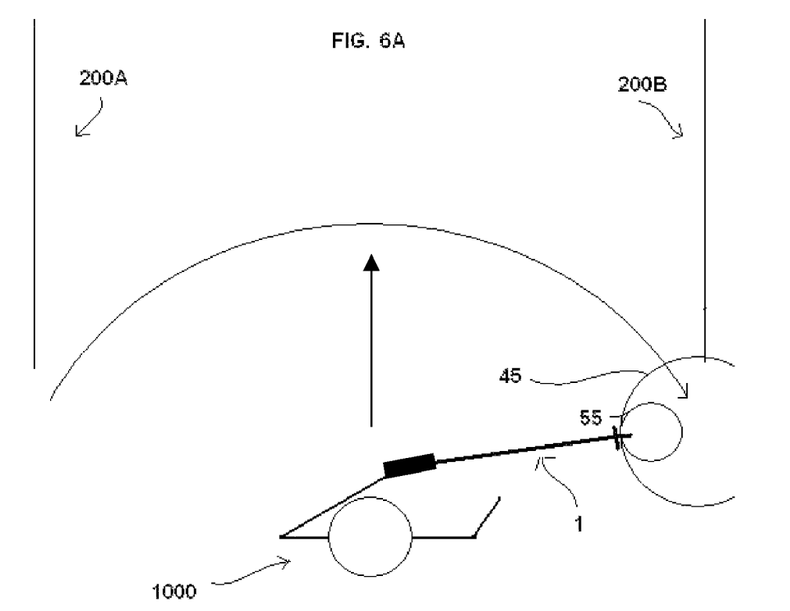

As shown in FIG. 6A, at the peak of the initial sweep to the right the user 1000 again presses the reset button 80. Pressing the reset button 80 here finalizes parameters for feedback from tactile pad 60 and the vibrator 130. In the environment shown in FIG. 6A, the user 1000 encounters the wall 200B at the peak of the initial sweep to the right. The sensors 40 and 50 detect reflections of their individually output signals from the wall 200B. The sensors 40 and 50 send the reflection information to the processor 110 which interprets the received reflections as the presence of a solid object and generates a map to be output to the solenoids 66.

Figure 6B:
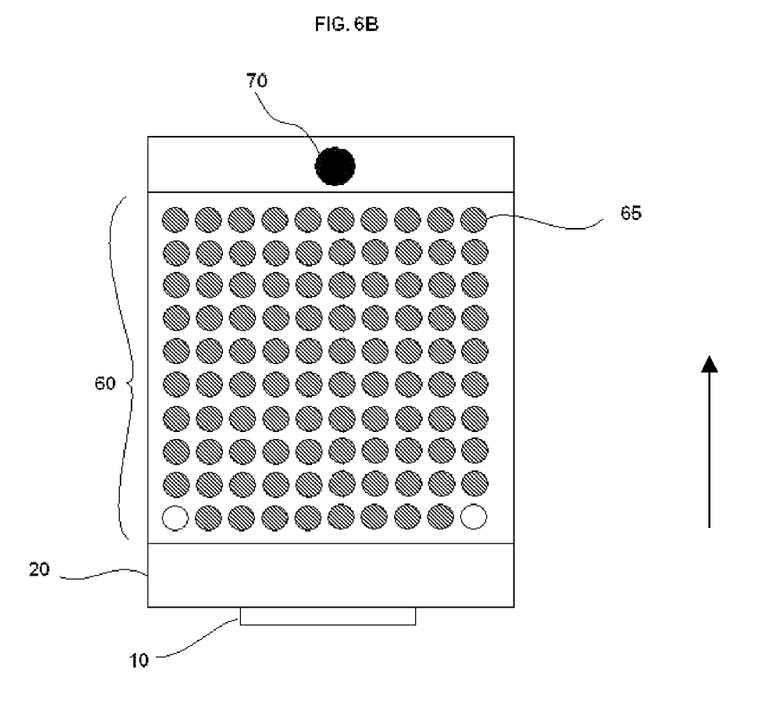

FIG. 6B illustrates that in response to the processed reflection information, the processor activates a solenoid 66 which projects a rubber button 65 on the tactile pad 60. The processor outputs the information from the left-to-right sweep to the tactile pad 60. The processor outputs the information about the rightmost part of the environment on the rightmost part of the tactile pad 60 (the right portion of FIG. 6B). Pressing the reset button 80 here signals the processor 110 that the sweep to the right has reached its farthest point and assigns any information processed from the area directly in front of the apparatus 1 to the rightmost side of the tactile pad 60. This ensures that the map generated by the processor 110 displays information corresponding to the region between the two presses of the reset button 80. It is also necessary to press the reset button here in case the apparatus 1 has no reflections to track changes in the apparatus 1's motion.

The leftmost and rightmost region defining process described above need only be performed once after resetting the apparatus 1; subsequent sweeps of the cane need not include a pressing of the reset button. In one exemplary embodiment, if the sensors 40 and 50 do not detect an obstacle during the course of either the first right-to-left or left-to-right sweeps the user continues to press the reset button at the peak of each right-to-left and left-to-right sweep until an object is detected which allows the processor to determine the sweep direction.

Figure 7A:
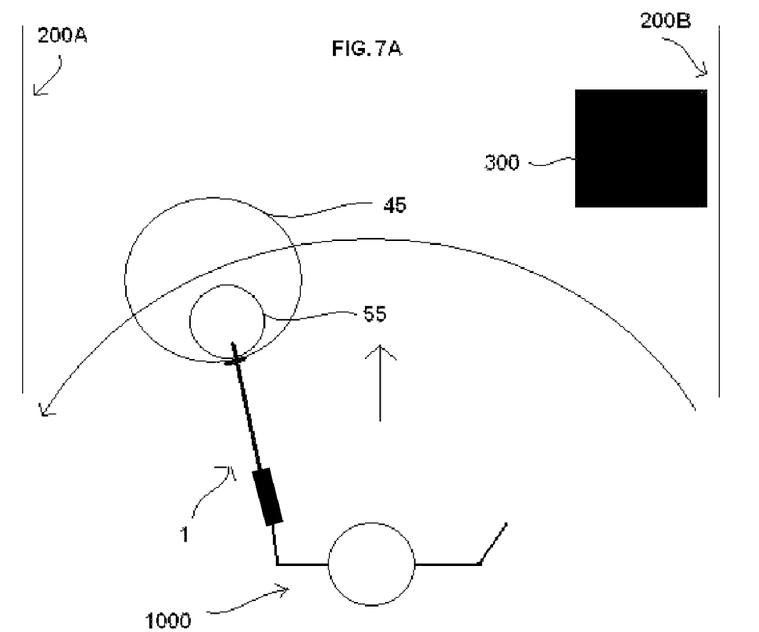
Figure 7B:
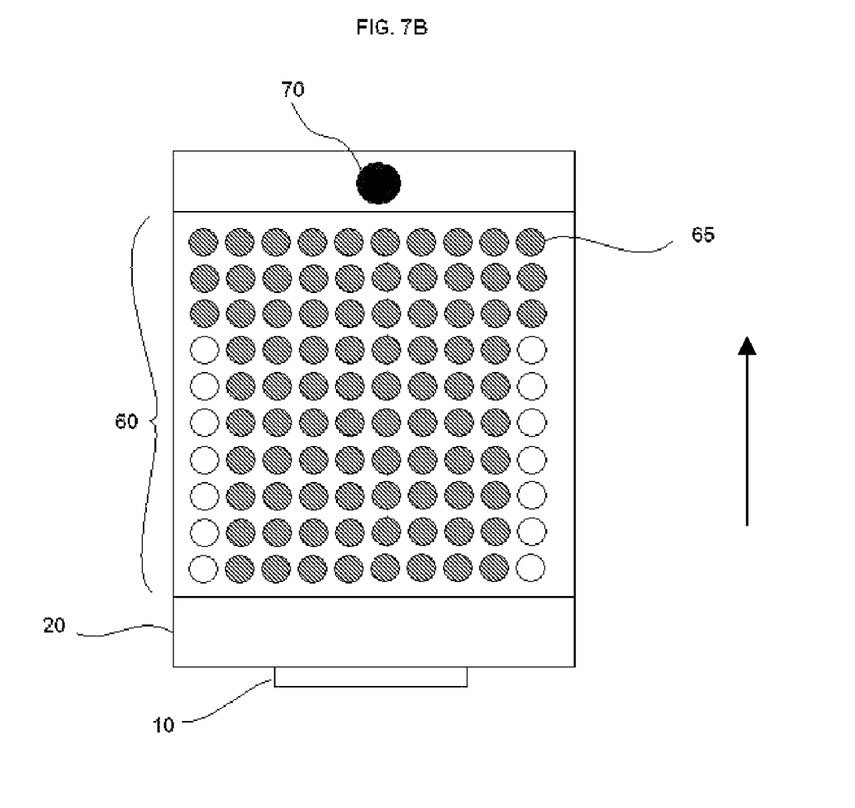

Referring now to FIGS. 7A and 7B the user 1000 again sweeps the apparatus 1 to the left while moving in a forward motion. The sensors 40 and 50 continue to detect reflections of their output signals and send that information to the processor 110. The processor 110 then creates a map to output to the tactile pad 60.

The tactile pad 60 displays a series of raised buttons 65 on the leftmost and rightmost sides in accordance with the parameters set by the user 1000. The raised buttons 65 indicate that the distance between the walls 200A and 200B and the user 1000 has decreased. The walls 200A and 200B are no longer indicated as being at the last row of buttons corresponding to the edge of the sensor range, instead the projected buttons extend 7 rows deep into the tactile pad corresponding to an object being well within the sensor range. The user 1000 then interprets the raised buttons 65 on the tactile pad 60 as distance information to an obstacle. An obstacle 300, such as a column, is present in the schematic top down view of FIG. 7A; however, the object 300 is not yet within range of the sensors 40 and 50 and so it is not reflected on the tactile pad 60.

Figure 8A:
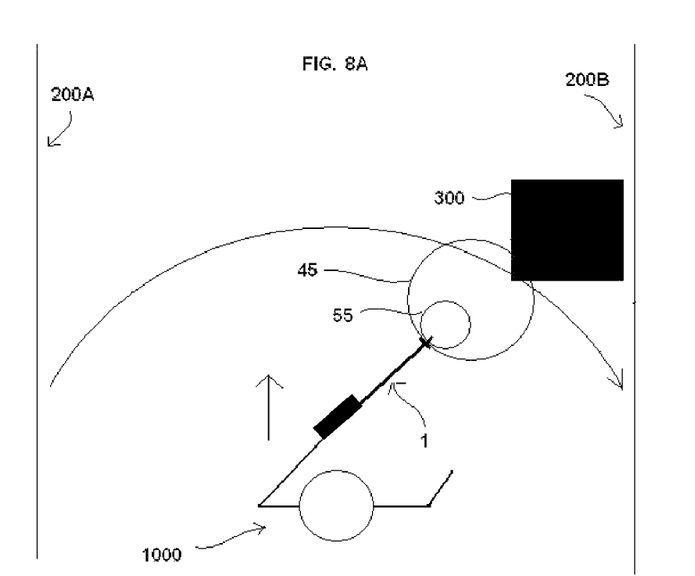
Figure 8B:
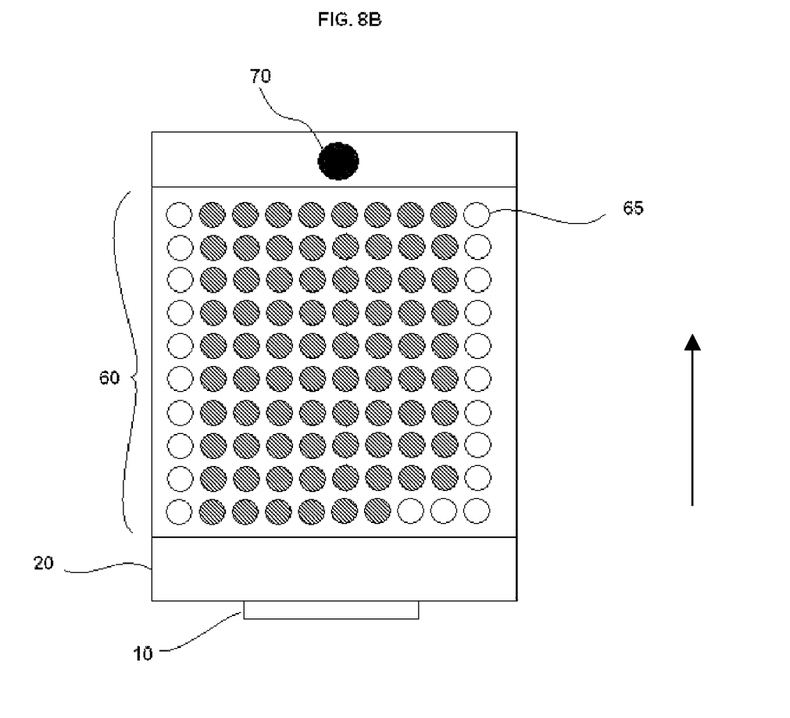

Referring now to FIGS. 8A and 8B the user 1000 again sweeps the apparatus 1 to the right while moving in a forward motion. The sensors 40 and 50 continue to detect reflections of their output signals and send that information to the processor 110. The processor 110 then creates a map to output to the tactile pad 60.

The tactile pad 60 displays a series of raised buttons 65 on the leftmost and rightmost sides in accordance with the parameters set by the user 1000. The raised buttons 65 indicate that the distance between the walls 200A and 200B and the user 1000 has decreased until the walls 200A and 200B are detectable by all the sensors 40 and 50 on the apparatus 1 and surround the user 1000. In addition to the walls 200A and 200B, the obstacle 300 is within range of the ultrasonic sensors 40. The obstacle 300 is located relatively far away from and to the right of the user 1000. The sensors also provide information about the obstacle 300's size. The processor 110 interprets this information from the sensors and outputs a map where the solenoids 66 represent the obstacle 300 as two raised buttons 65 on the last row of the tactile pad 60 corresponding to the obstacle 300's size and location relative to the sensors 40 and 50. The user 1000 then interprets the raised buttons 65 on the tactile pad 60 as distance and direction information to an obstacle.

Figure 9A:
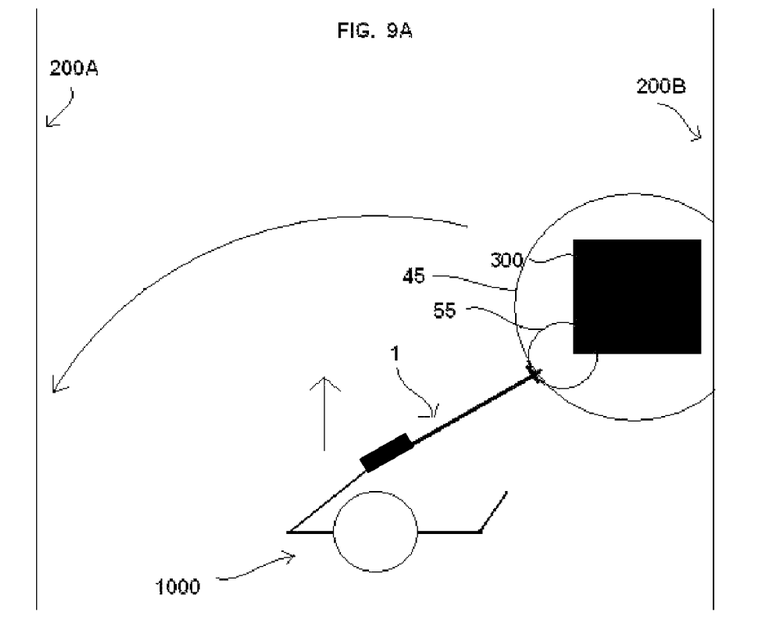
Figure 9B:
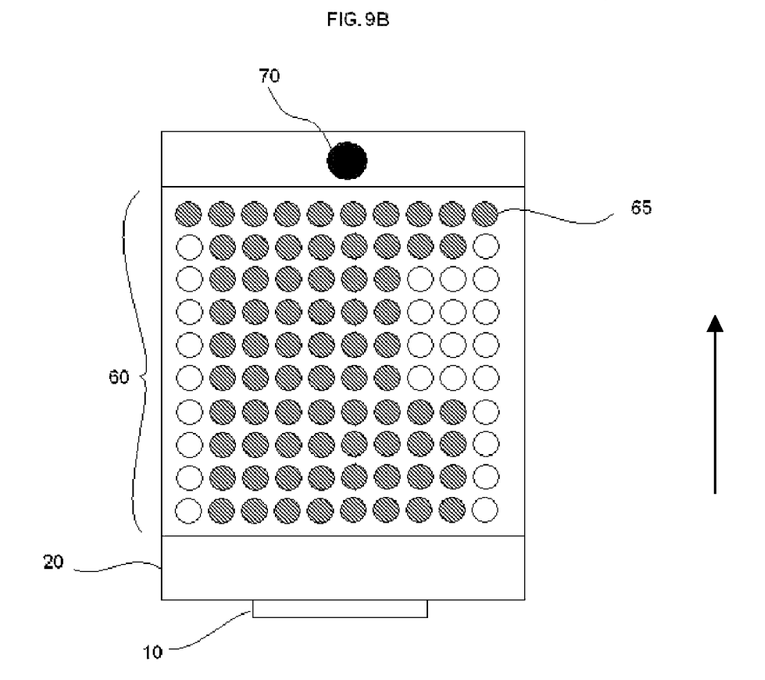

Referring now to FIGS. 9A and 9B the user 1000 again sweeps the apparatus 1 to the left while moving in a forward motion. The sensors 40 and 50 continue to detect reflections of their output signals and send that information to the processor 110. The processor 110 then creates a map to output to the tactile pad 60.

The tactile pad 60 displays a series of raised buttons 65 on the leftmost and rightmost sides in accordance with the parameters set by the user 1000. The raised buttons 65 on the leftmost and rightmost sides of the tactile pad 60 indicate that the user 1000 is still surrounded by the walls 200A and 200B. The obstacle 300 is now detectable by both the ultrasonic sensors 40 and the infrared sensors 50. The entire obstacle 300 is within range of the ultrasonic sensors 40. Therefore, the processor 110 interprets this information from the sensors as size information about the obstacle 300 and generates a map which displays the obstacle 300 as four raised buttons 65 on the right side of the tactile pad 60 corresponding to the obstacle 300's size and location relative to the sensors 40 and 50. In the exemplary embodiment wherein each row of buttons indicates sensor information of a distance of about one foot, the obstacle 300 would be approximately four feet long and two feet wide. The user 1000 then interprets the raised buttons 65 on the tactile pad 60 as distance and direction information to an obstacle.

Figure 10A:
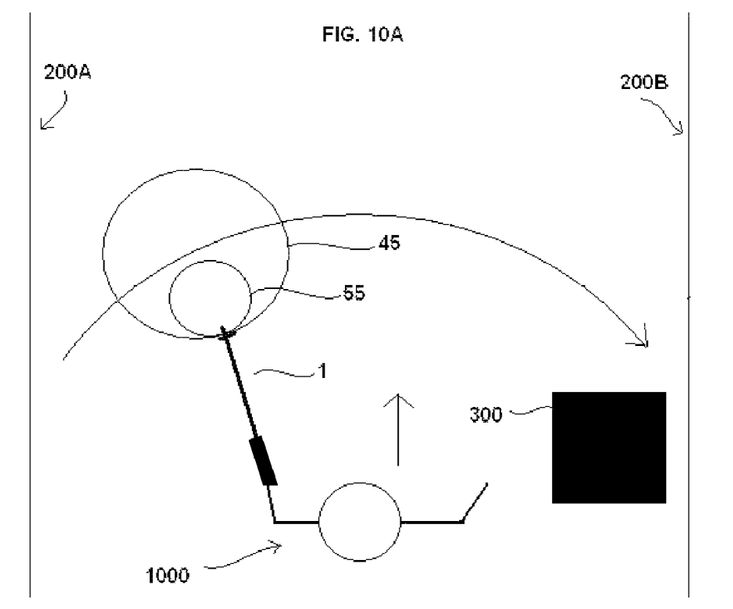
Figure 10B:
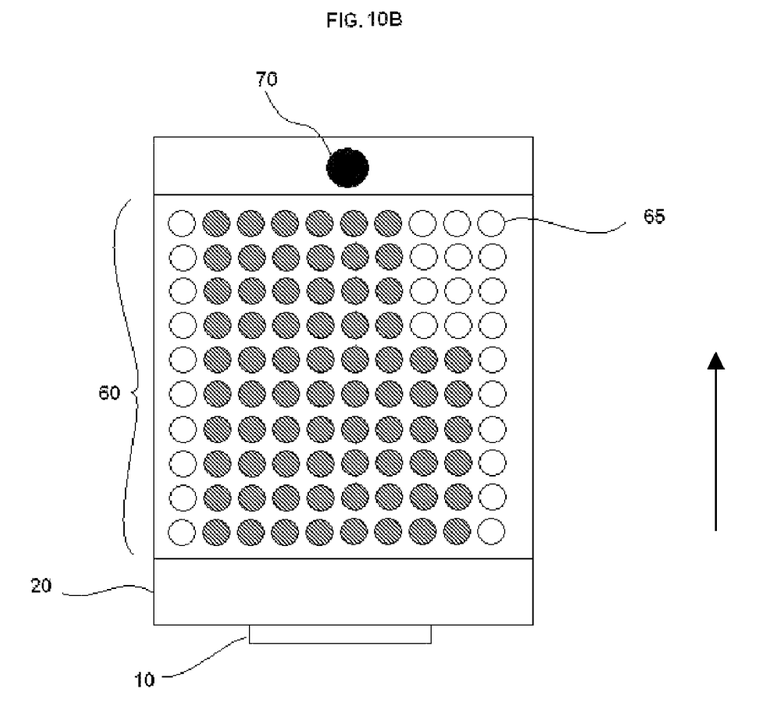

Referring now to FIGS. 10A and 10B the user 1000 again sweeps the apparatus 1 to the right while moving in a forward motion. The sensors 40 and 50 continue to detect reflections of their output signals and send that information to the processor 110. The processor 110 then creates a map to output to the tactile pad 60.

The tactile pad 60 displays a series of raised buttons 65 on the leftmost and rightmost sides in accordance with the parameters set by the user 1000. The raised buttons 65 on the leftmost and rightmost sides of the tactile pad 60 indicate that the user 1000 is still surrounded by the walls 200A and 200B. The obstacle 300 is still detectable by both the ultrasonic sensors 40 and the infrared sensors 50. The majority of the obstacle 300 is now within range of the infrared sensors 50. Due to the user 1000's forward motion, the obstacle 300 is now represented as raised buttons 65 closer to the handle positioner 70. The user 1000 then interprets the raised buttons 65 on the tactile pad 60 as distance and direction information to an obstacle.

Figure 11A:
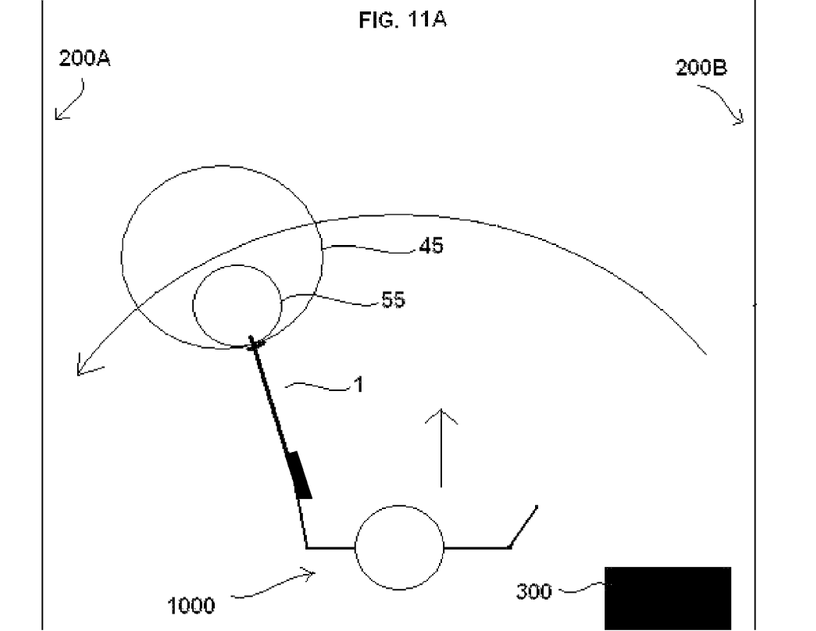
Figure 11B:
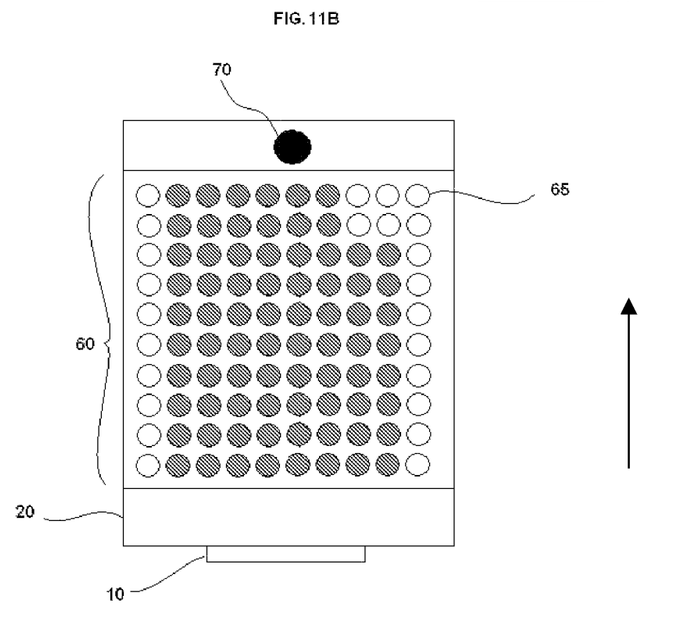

Finally, referring now to FIGS. 11A and 11B the user 1000 again sweeps the apparatus 1 to the left while moving in a forward motion. The sensors 40 and 50 continue to detect reflections of their output signals and send that information to the processor 110. The processor 110 then creates a map to output to the tactile pad 60.

The tactile pad 60 displays a series of raised buttons 65 on the leftmost and rightmost sides in accordance with the parameters set by the user 1000. The raised buttons 65 on the leftmost and rightmost sides of the tactile pad 60 indicate that the user 1000 is still surrounded by the walls 200A and 200B. The obstacle 300 is still detectable by both the ultrasonic sensors 40 and the infrared sensors 50. However, due to the user 1000's forward motion the obstacle 300 is now substantially parallel to and behind the user 1000. The sensors 40 and 50 are only contacting the obstacle 300 at the farthest end of the right sweep. Therefore, the processor 110 interprets this information from the sensors and generates a map which displays the obstacle 300 as two raised buttons 65 on the right side of the tactile pad 60 corresponding to the obstacle 300's location relative to the sensors 40 and 50. The user 1000 then interprets the raised buttons 65 on the tactile pad 60 as distance and direction information to an obstacle.

While one exemplary embodiment of a method of using the apparatus 1 has been described with relation to FIGS. 5A-11B additional exemplary embodiments are within the scope of the present invention. The apparatus 1 may be used in substantially any terrain and the method of operation may be modified accordingly. In one exemplary embodiment the apparatus 1 may be used to detect the presence of stairs along the user 1000's path. In another exemplary embodiment the apparatus 1 may be used to detect holes or depressions in the ground along the user 1000's path. In the exemplary embodiments wherein the apparatus 1 detects changes in elevation along the path of the user 1000, such as stairs or depressions, etc., the processor 110 may activate the vibrator 130 as an additional source of feedback information to the user 1000.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for providing information about a three-dimensional environment to a user, the apparatus comprising:
   a shaft, operated by the user, to probe the environment;
   at least one sensor disposed along the shaft;
   a processor which receives signals reflective of the environment from the at least one sensor and operatively controls a plurality of actuators to represent the environment sensed by the at least one sensor; and
   a plurality of tactile buttons, which are disposed on a handle of the shaft and which are operatively coupled to respective ones of the plurality of actuators to transmit the representation to the user.

2. The apparatus of claim 1, wherein the at least one sensor comprises at least one ultrasonic sensor.

3. The apparatus of claim 2, wherein the at least one sensor further comprises at least one infrared sensor.

4. The apparatus of claim 3, wherein the at least one ultrasonic sensor comprises a first and second ultrasonic sensor and the at least one infrared sensor comprises a first, second and third infrared sensor.

5. The apparatus of claim 3, wherein the plurality of tactile buttons are arrayed in a matrix shape on a tactile pad.

6. The apparatus of claim 5, wherein the plurality of tactile buttons comprises:
   a first plurality of tactile buttons arranged in a first matrix shape; and
   a second plurality of tactile buttons arranged in a second matrix shape,
   wherein the first plurality of tactile buttons convey information from the infrared sensor and the second plurality of tactile buttons convey information from the ultrasonic sensor.

7. The apparatus of claim 6, wherein the second matrix shape is disposed between the sensors and the first matrix shape.

8. The apparatus of claim 1, wherein the plurality of actuators further comprises a vibrator.

9. The apparatus of claim 1, wherein the actuator comprises a latching solenoid.

10. The apparatus of claim 1, wherein the shaft comprises a cane.

11. An apparatus for providing information about a three-dimensional environment to a user, the apparatus comprising:
    a handle;
    at least one sensor disposed on and operatively coupled to the handle;
    a tactile pad disposed on the handle;
    a plurality of tactile buttons arrayed on the tactile pad;
    a plurality of actuators, wherein each actuator is operatively coupled to one of the plurality of tactile buttons to control a height thereof in relation to the tactile pad; and
    a processor which receives signals from the at least one sensor and controls positioning of the plurality of actuators to represent a physical environment sensed by the at least one sensor.

12. An apparatus for providing information about a three-dimensional environment to a user, the apparatus comprising:
    a shaft, operated by the user, to probe the environment in a repeatable back and forth pattern;
    at least one sensor and a reset button disposed along the shaft, the reset button being actuated by the user with the shaft positioned at selected positions of the repeatable back and forth pattern;
    a processor, which receives signals reflective of features of the environment from the at least one sensor in response to the reset button actuation, and which operatively controls a plurality of actuators to update a representation of the environment features upon each reset button actuation; and
    a plurality of tactile buttons, which are disposed on a handle of the shaft and which are operatively coupled to respective ones of the plurality of actuators to transmit the representation to the user.

\* \* \* \* \*